F. HEMENWAY.
AUTOMOBILE.
APPLICATION FILED OCT. 13, 1913.

1,139,763.

Patented May 18, 1915.
4 SHEETS—SHEET 1.

F. HEMENWAY.
AUTOMOBILE.
APPLICATION FILED OCT. 13, 1913.

1,139,763.

Patented May 18, 1915.
4 SHEETS—SHEET 3.

Witnesses:
H. S. Bull
B. G. Richards

Inventor
Frank Hemenway
By Joshua R. H. Horn
His Attorney

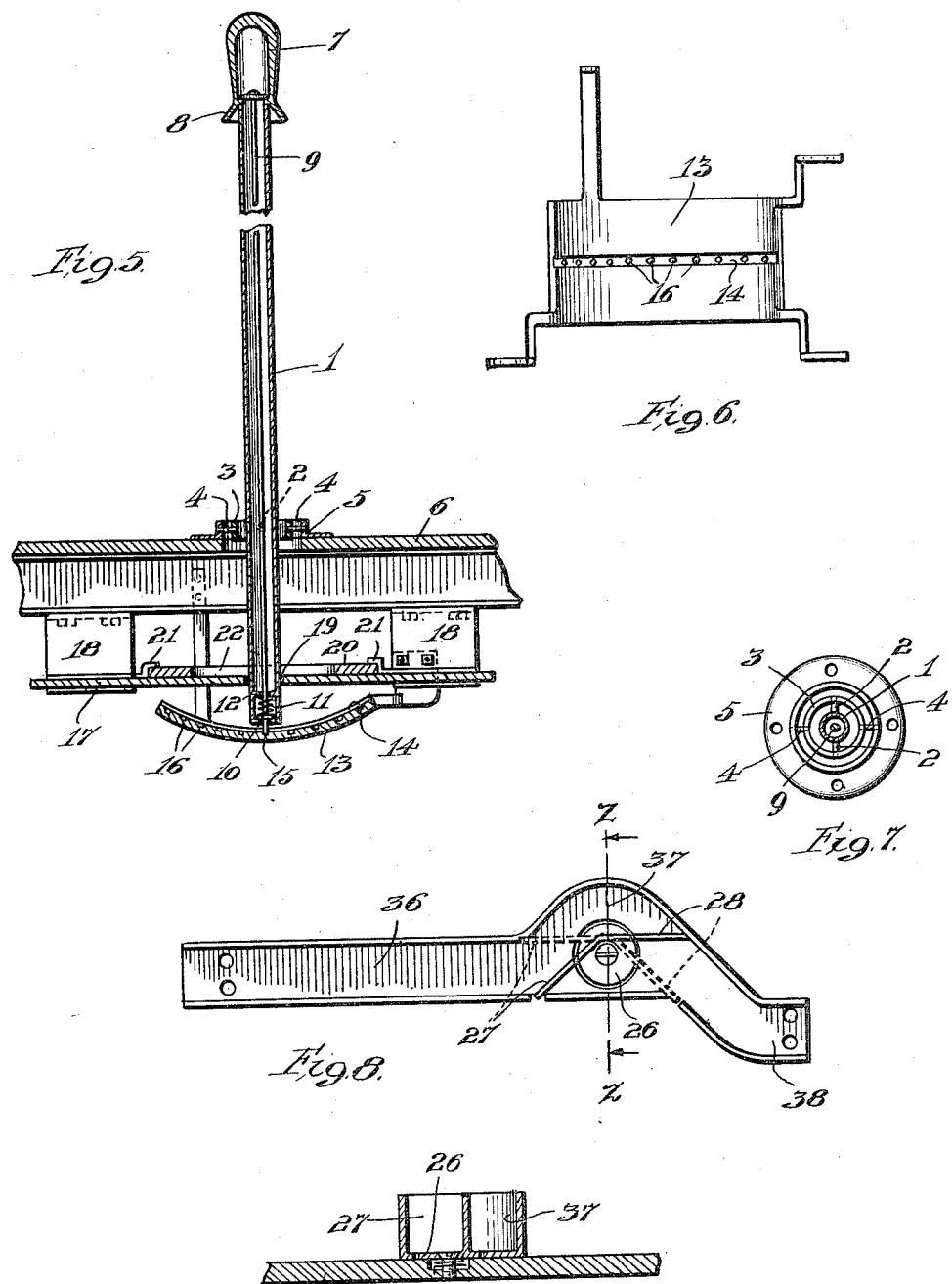

UNITED STATES PATENT OFFICE.

FRANK HEMENWAY, OF CHICAGO, ILLINOIS.

AUTOMOBILE.

1,139,763. Specification of Letters Patent. Patented May 18, 1915.

Application filed October 13, 1913. Serial No. 794,907.

*To all whom it may concern:*

Be it known that I, FRANK HEMENWAY, a citizen of the United States, and a resident of the city of Chicago, county of Cook, and State of Illinois, have invented certain new and useful Improvements in Automobiles, of which the following is a specification.

My invention relates to improvements in automobiles and has for its object the provision of improved means of control for an automobile whereby manipulation of one controlling member will serve as a means for the complete control of the automobile.

The invention consists in the combinations and arrangements of parts hereinafter described and claimed.

Figure 1:
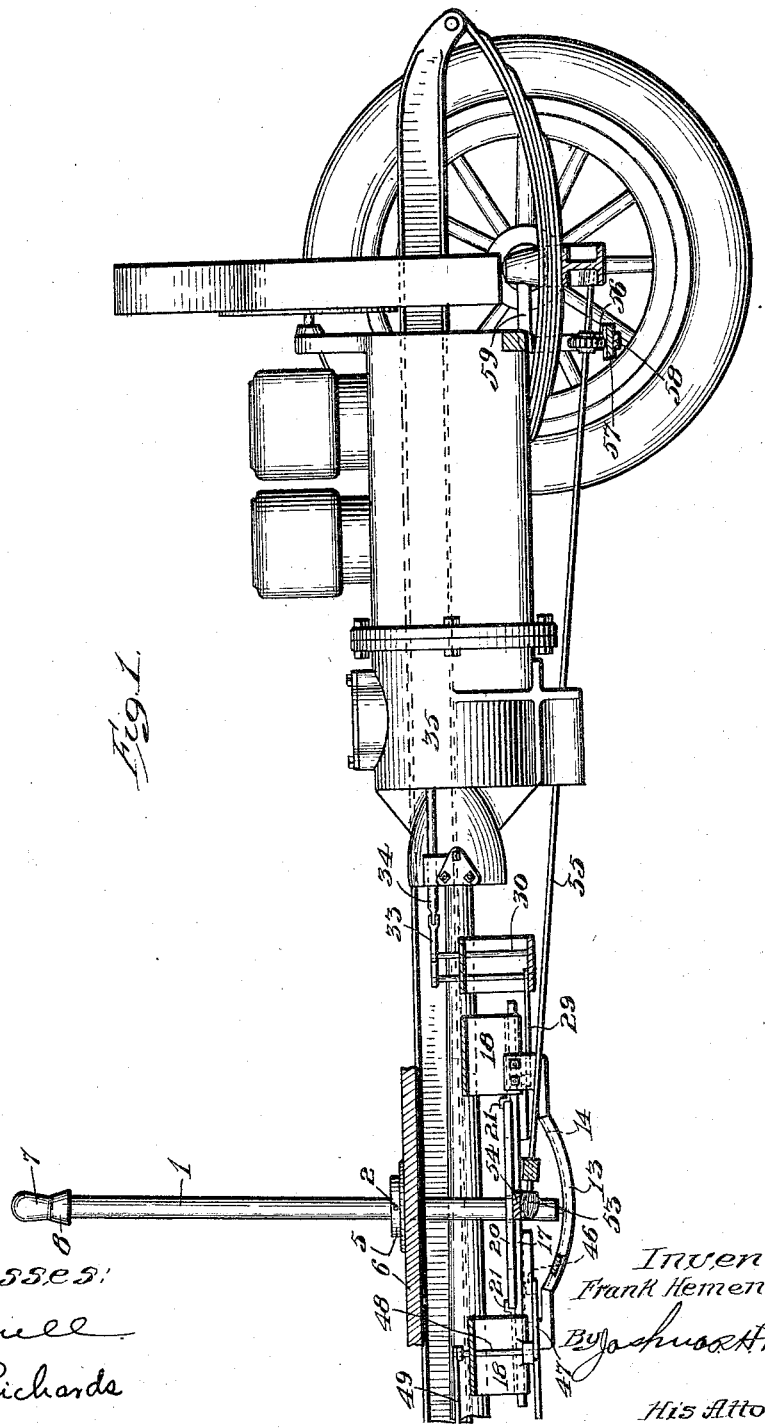
Figure 2:
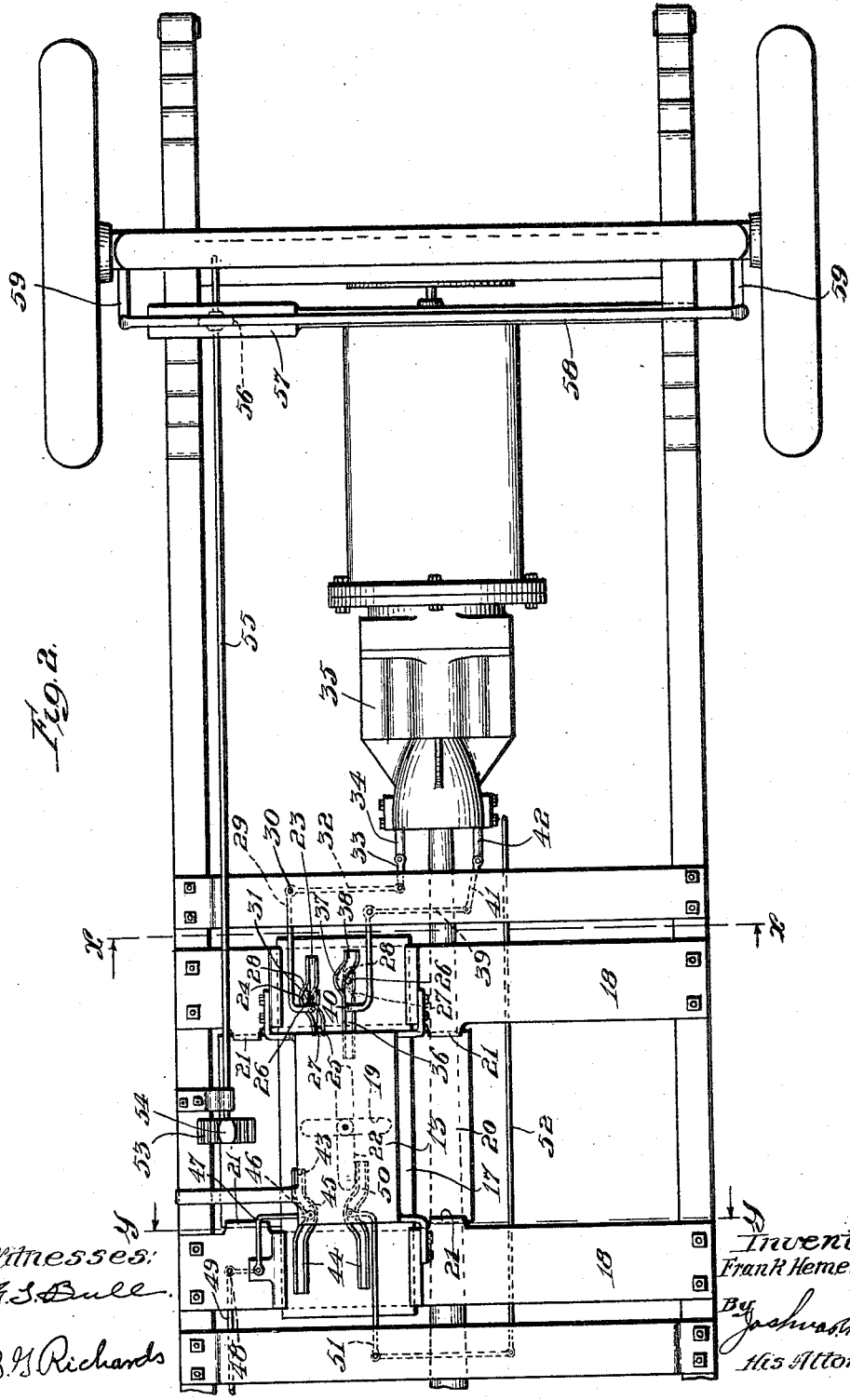
Figure 3:
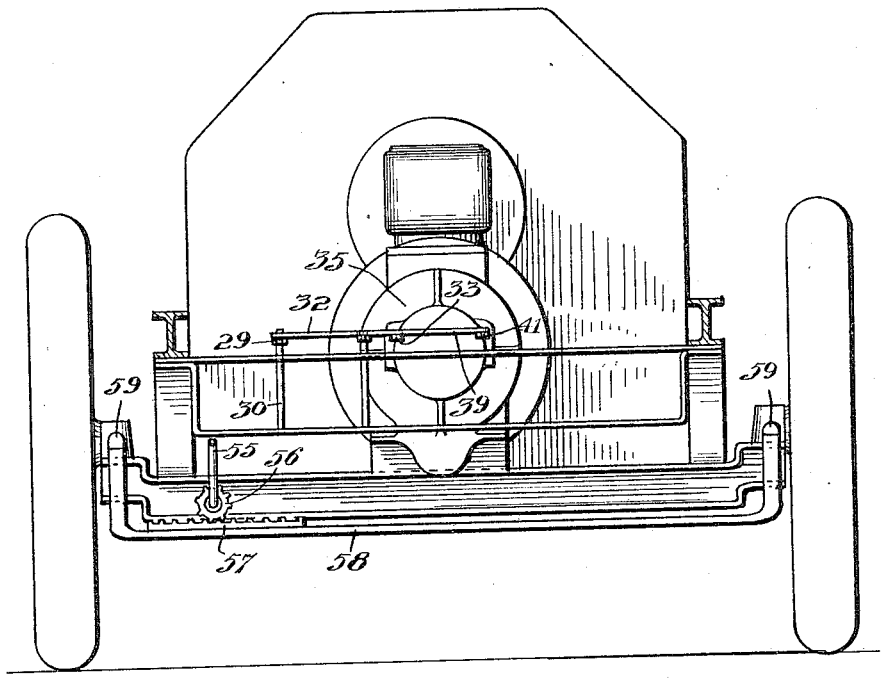
Figure 4:
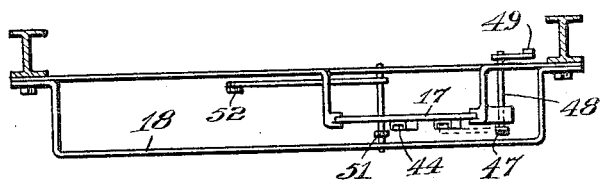

The invention will be best understood by reference to the accompanying drawings forming a part of this specification, and in which, Figure 1 is a sectional view taken through the forward part of an automobile equipped with controlling means embodying my invention, Fig. 2, a bottom plan view corresponding to Fig. 1, Fig. 3, a section taken on line $x$—$x$ of Fig. 2, Fig. 4, a section taken on line $y$—$y$ of Fig. 2, Fig. 5, an enlarged sectional view of a controlling lever employed in the construction, Fig. 6, a detail view of a locking plate employed in conjunction with said lever, Fig. 7, a detail view of the lever mounting, Fig. 8, an enlarged view of one of a plurality of tortuous guide members employed in the construction, and Fig. 9, a section taken on line $z$—$z$ of Fig. 8.

The preferred form of construction as illustrated in the drawings comprises a controlling lever 1 which is in the form of a hollow tube and is pivoted on trunnions 2 in ring 3 which in turn is pivoted on trunnions 4 in a plate 5 secured to the floor 6 of the automobile. Trunnions 2 are arranged transversely of the automobile and trunnions 4 are arranged longitudinally thereof so that said lever is mounted to swing in any direction, as will be readily understood. An operating handle 7 is arranged to rock in any direction upon the upper end of lever 1 and is provided with depending outwardly flaring flanges 8 which serve to maintain said handle on said lever when rocked. A rod 9 is arranged in lever 1 and secured at its upper end in handle 7, the lower end of rod 9 carrying a stop 10 operating against one end of a spring 11, the other end of said spring being positioned against a stop shoulder 12 on the interior of tube 1. A segmental locking plate 13 is arranged under lever 1, as indicated and is provided with a groove 14 arranged to receive the lower end 15 of rod 9 when lever 1 is in a vertical position or is swung in a longitudinal vertical plane. The bottom of groove 14 is also provided with notches 16 to receive the end 15 of rod 9 and lock said lever in different positions, as will be readily understood. By this arrangement it will be observed that by manipulating handle 7 rod 9 may be withdrawn from recesses 16 and the lever permitted to swing in a vertical longitudinal plane, and that upon further withdrawal of rod 9 the end 15 will be withdrawn from groove 14 and the lever permitted to swing freely in any direction.

A plate 17 is arranged beneath the floor of the automobile and is mounted in suitable guides 18 to slide longitudinally with reference to the body of the automobile. Plate 17 is provided with a transversely extending slot 19 through which lever 1 passes and another plate 20 is placed above plate 17 and mounted to slide transversely in suitable guides 21, said plate 20 being provided with a longitudinal slot 22 through which lever 1 also passes. By this arrangement, it will be observed that when lever 1 is swung in any direction, any longitudinal swing of the lever will impart longitudinal motion to plate 17 and any lateral swing of lever 1 will impart transverse motion to plate 20, said plates thus serving in effect to resolve the motion of lever 1 into its component longitudinal and lateral swings. When the lever is moved only forwardly and rearwardly, plate 17 only will be moved, and when said lever is moved only laterally, plate 20 only will be moved.

A tortuous guide channel is secured on the bottom of plate 17, said guide channel consisting of a longitudinal forward portion 23, a laterally off-set portion 24 and a longitudinal rear portion 25, the rear portion 25 being off-set from the forward portion 23 in the opposite direction from portion 24 and the same distance. A spring held plate 26 is mounted in said guide member, as indicated in Fig. 9, said plate carrying an angularly disposed wing or flange 27 normally projecting across the forward portion of off-set portion 24, a wing or flange 28 adapted to normally constitute the corresponding wall of the rear portion of off-set portion 24, as shown. A bell crank lever 29 is pivotally mounted at 30 under the body of the vehicle and carries at one end a roller 31 normally resting in channel portion 23, as shown in Fig. 2. The other arm 32 of said bell crank is connected by means of a link 33 with the ordinary gear shifting rod 34 operating in the ordinary gear box 35 to connect the engine with the drive shaft of the automobile through the low gear forward and the reverse gear as is usual by moving said rod 34 inwardly and outwardly. The arrangement is such that when lever 1 is moved forwardly, bell crank 29 will be shifted to draw rod 34 outwardly from gear box 35 and shift the low forward gears into mesh. Further forward movement of lever 1 will again shift bell crank 29 to return rod 34 to original position and disconnect the low gear forward. Rearward movement of lever 1 from its position will have no effect upon bell crank 29 until roller 31 passes into the rear portion of off-set portion 24 when said bell crank will be shifted to push rod 34 inwardly and thus shift the reverse gears into mesh. It will be observed that the reverse gears will also be shifted into mesh when lever 1 is moved rearwardly from its initial position.

Plate 17 also carries another tortuous guide member comprising a rear portion 36, an off-set portion 37 and a forward portion 38, this guide member being identical with the one already described but reversed in position and therefore needs no further description. A bell crank 39 carries a roller 40 normally positioned in guide portion 36, the other arm of bell crank 39 being connected by a link 41 with gear operating rod 42, said rod 42 being connected to operate the intermediate and high forward gears in box 35, as will be readily understood. The arrangement is such that upon forward movement of lever 1 beyond the position where the first low forward gear is thrown out of mesh as explained above, lever 39 will first operate to draw rod 42 outwardly from box 35 and shift the intermediate gear into mesh. Farther forward movement of lever 1 will operate bell crank 39 to push rod 42 inwardly to box 35 and thus throw the high gear into mesh. When it is desired to return from the high gear to reverse gear, lever 1 may be moved at once for this purpose, rollers 40 and 31 being prevented from passing through off-set portions 37 and 24 by the wings 27 and 28, as will be readily understood.

Another guide member is mounted on the bottom of plate 17 and is provided with a front portion 43 and rear portion 44 which are in alinement with each other and connected with an off-set portion 45. A roller 46 on a bell crank 47 normally rests in off-set portion 45, the other arm 48 of said bell crank being connected with a rod 49 which in turn is connected with the brake of the automobile. By this arrangement it will be observed that upon movement of lever 1 in either direction from its normal position as shown, the brake rod 49 will be operated, said brake rod being connected with the brake to release the same, so that when lever 1 is in its normal position of rest, the brake of the automobile will be applied as will be readily understood by those skilled in the art.

Another tortuous guide member 50 is arranged on the bottom of plate 17 and is similar in all respects to guide member 43, 44 except that the off-set portion therein is turned in the other direction. This guide member 50 serves to operate a bell crank 51 which in turn operates a rod 52 which is connected with the throttle valve and timer of the engine and serves as a means for controlling said engine. The arrangement is such that the engine will be throttled and the spark retarded when lever 1 is in its normal position of rest but said spark will be advanced and the engine unthrottled upon movement of the lever in either forward or rearward direction thus giving full power of the engine when in use to drive the vehicle but automatically reduce said power when the vehicle is at rest.

Plate 20 carries a laterally projecting rack bar 53 which meshes with a pinion 54 on a longitudinally extending shaft 55. Shaft 55 carries a pinion 56 which meshes with a rack bar 57 on a connecting bar 58 which connects the usual arms 59 on the steering knuckles of the automobile. By this arrangement, it will be observed that upon lateral shift of lever 1, rack bar 57 will be operated to steer the vehicle from one side to the other depending upon the direction in which lever 1 is shifted.

By the construction disclosed it will be observed that by manipulating the single lever 1 the automobile may be steered, the transmission gears shifted, the brake operated and the engine controlled.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a motor driven vehicle provided with transmission gearing and steering mechanism, of a lever mounted on said vehicle to swing in two different directions; two plates slidably mounted on said vehicle, one of said plates being mounted to slide in one direction of swing of said lever and the other plate being mounted to slide in the other direction of swing of said lever, said plates being provided with intersecting slots arranged to correspond with the directions of swing of said lever and said lever being passed through said slots; and operative connections between said plates and said gearing and steering mechanism, whereby the movement of one plate shifts said gearing and the movement of the other plate operates said steering mechanism, substantially as described.

2. The combination with a motor driven vehicle provided with transmission gearing and steering mechanism, of a lever pivoted on said vehicle on two different axes; two plates slidably mounted on said vehicle, one of said plates being mounted to slide in one direction of swing of said lever and the other plate being mounted to slide in the other direction of swing of said lever, said plates being provided with intersecting slots arranged to correspond with the directions of swing of said lever and said lever being passed through said slots; and operative connections between said plates and said gearing and steering mechanism, whereby the movement of one plate shifts said gearing and the movement of the other plate operates said steering mechanism, substantially as described.

3. The combination with a motor driven vehicle provided with transmission gearing and steering mechanism, of a support on said vehicle mounted to swing in one direction; a lever mounted in said support to swing in a different direction; two plates slidably mounted on said vehicle, one of said plates being mounted to slide in one direction of swing of said lever and the other plate being mounted to slide in the other direction of swing of said lever, said plates being provided with intersecting slots arranged to correspond with the directions of swing of said lever and said lever being passed through said slots; and operative connections between said plates and said gearing and steering mechanism, whereby the movement of one plate shifts said gearing and the movement of the other plate operates said steering mechanism, substantially as described.

4. The combination with a motor driven vehicle provided with transmission gearing and steering mechanism, of a support on said vehicle pivoted to swing on one axis; a lever pivoted in said support to swing on a different axis; two plates slidably mounted on said vehicle, one of said plates being mounted to slide in one direction of swing of said lever and the other plate being mounted to slide in the other direction of swing of said lever, said plates being provided with intersecting slots arranged to correspond with the directions of swing of said lever and said lever being passed through said slots; and operative connections between said plates and said gearing and steering mechanism, whereby the movement of one plate shifts said gearing and the movement of the other plate operates said steering mechanism, substantially as described.

5. The combination with a motor driven vehicle provided with transmission gearing and steering mechanism, of a lever mounted on said vehicle to swing in two different directions; two plates slidably mounted on said vehicle, one of said plates being mounted to slide in one direction of swing of said lever and the other plate being mounted to slide in the other direction of swing of said lever, said plates being provided with intersecting slots arranged to correspond with the directions of swing of said lever and said lever being passed through said slots; an operative connection between one of said plates and said steering mechanism; a tortuous guide on said other plate; a lever operable by said guide; and an operative connection between said last mentioned lever and said gearing, substantially as described.

6. The combination with a motor driven vehicle provided with transmission gearing and steering mechanism, of a lever pivoted on said vehicle on two different axes; two plates slidably mounted on said vehicle, one of said plates being mounted to slide in one direction of swing of said lever and the other plate being mounted to slide in the other direction of swing of said lever, said plates being provided with intersecting slots arranged to correspond with the directions of swing of said lever and said lever being passed through said slots; an operative connection between one of said plates and said steering mechanism; a tortuous guide on said other plate; a lever operable by said guide; and an operative connection between said last mentioned lever and said gearing, substantially as described.

7. The combination with a motor driven vehicle provided with transmission gearing and steering mechanism, of a support on said vehicle mounted to swing in one direction; a lever mounted in said support to swing in a different direction; two plates slidably mounted on said vehicle, one of said plates being mounted to slide in one direction of swing of said lever and the other plate being mounted to slide in the other direction of swing of said lever, said plates being provided with intersecting slots arranged to correspond with the directions of swing of said lever and said lever being passed through said slots; an operative connection between one of said plates and said steering mechanism; a tortuous guide on said other plate; a lever operable by said guide; and an operative connection between said last mentioned lever and said gearing, substantially as described.

8. The combination with a motor driven vehicle provided with transmission gearing and steering mechanism, of a support on said vehicle pivoted to swing on one axis; a lever pivoted in said support to swing on a different axis; two plates slidably mounted on said vehicle, one of said plates being mounted to slide in one direction of swing of said lever and the other plate being mounted to slide in the other direction of swing of said lever, said plates being provided with intersecting slots arranged to correspond with the directions of swing of said lever and said lever being passed through said slots; an operative connection between one of said plates and said steering mechanism; a tortuous guide on said other plate; a lever operable by said guide; and an operative connection between said last mentioned lever and said gearing, substantially as described.

9. The combination with a motor driven vehicle provided with transmission gearing, steering mechanism, a brake and engine control, of a lever pivoted on said vehicle to swing on axes arranged at right angles to each other; two plates slidably mounted on said vehicle, one of said plates being mounted to slide in one direction of swing of said lever and the other plate being mounted to slide in the other direction of the swing of said lever, said plates being provided with intersecting slots arranged to correspond with the directions of swing of said lever, said lever being passed through said slots; an operative connection between one of said plates and said steering mechanism; a plurality of tortuous guide members on said other plate; levers operable by said guide; and operative connections between said last mentioned levers and said gearing, brake and engine control, substantially as described.

In testimony whereof I have signed my name to this specification in the presence of two subscribing witnesses.

FRANK HEMENWAY.

Witnesses:
JOSHUA R. H. POTTS,
ARTHUR A. OLSON.

Copies of this patent may be obtained for five cents each, by addressing the "Commissioner of Patents, Washington, D. C."